R. A. OLDFIELD.
LENS OR REFLECTOR SUPPORT.
APPLICATION FILED JUNE 26, 1913.

1,112,470.

Patented Oct. 6, 1914.
3 SHEETS—SHEET 1.

R. A. OLDFIELD.
LENS OR REFLECTOR SUPPORT.
APPLICATION FILED JUNE 26, 1913.
1,112,470.
Patented Oct. 6, 1914.
3 SHEETS—SHEET 2.
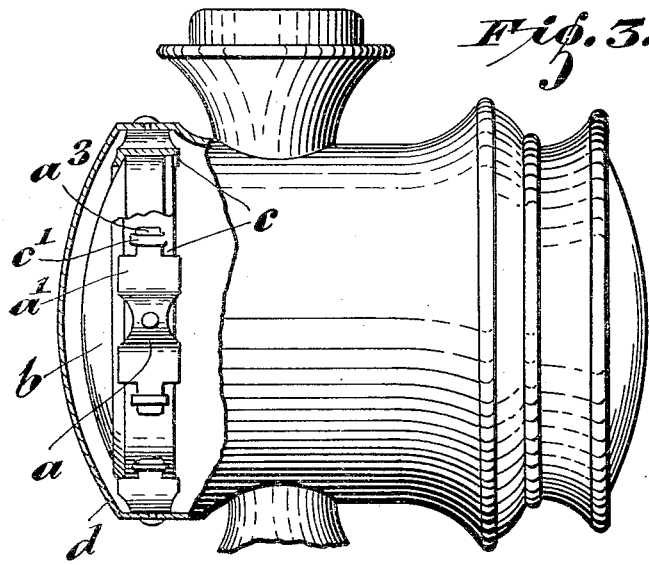
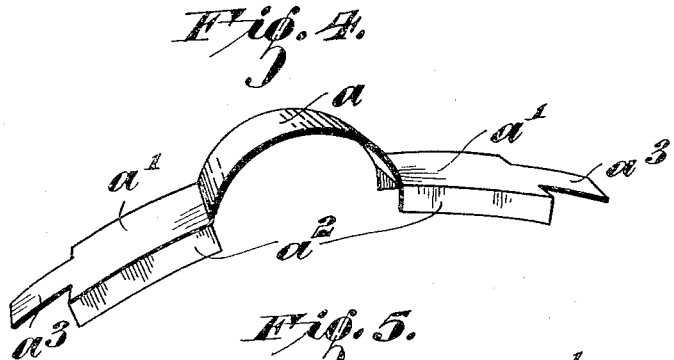
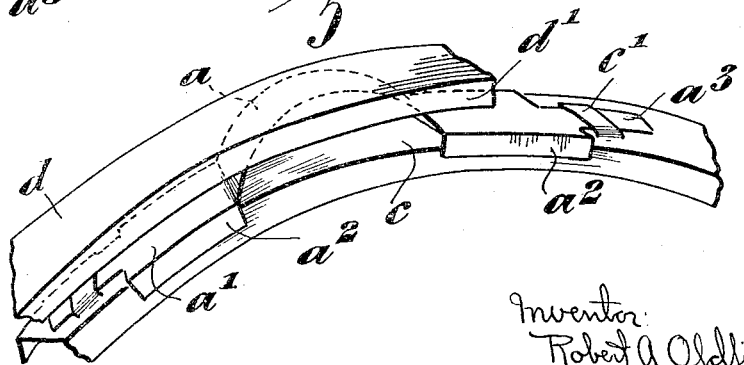
Inventor
Robert A Oldfield
by B. Singer
Atty.
Witnesses:

R. A. OLDFIELD.
LENS OR REFLECTOR SUPPORT.
APPLICATION FILED JUNE 26, 1913.
1,112,470. Patented Oct. 6, 1914.
3 SHEETS—SHEET 3.
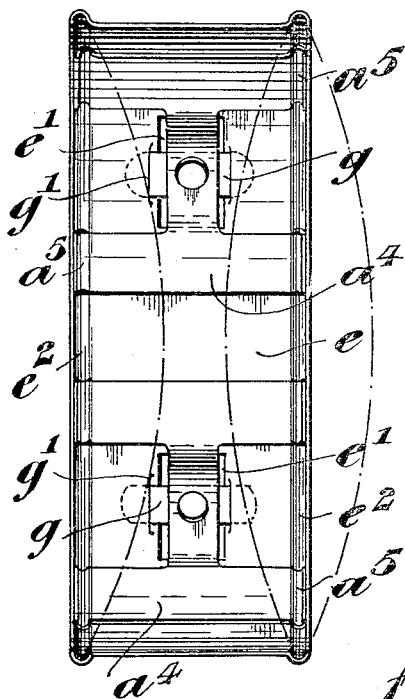
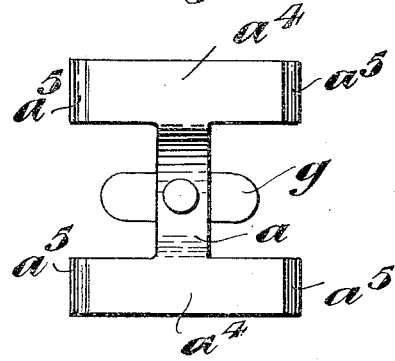
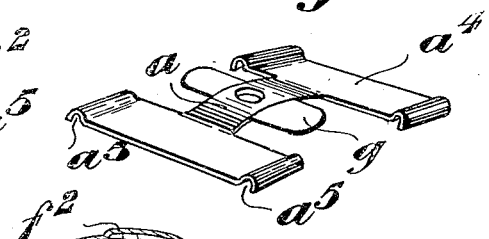
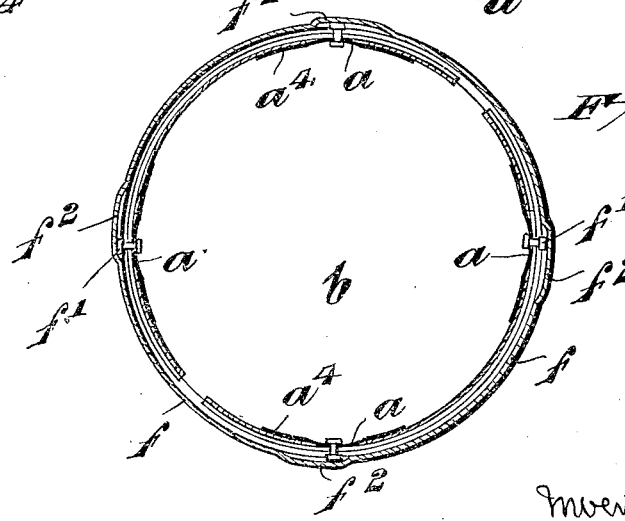

UNITED STATES PATENT OFFICE.

ROBERT ALEXANDER OLDFIELD, OF BIRMINGHAM, ENGLAND.

LENS OR REFLECTOR SUPPORT.

1,112,470.  Specification of Letters Patent.  Patented Oct. 6, 1914.

Application filed June 26, 1913. Serial No. 775,931.

*To all whom it may concern:*

Be it known that I, ROBERT ALEXANDER OLDFIELD, a subject of the Kingdom of Great Britain, residing at Refulgent Works, Warwick street, Bordesley, Birmingham, in the county of Warwick, England, manufacturer, have invented certain new and useful Improvements in or Relating to Lens or Reflector Supports, of which the following is a specification.

This invention relates to fittings for holding or retaining circular glass articles and in connection with which bow-shaped spring members have been employed as a means for supporting the glass bodies or articles in position.

The spring supporting members according to this invention which allow for the expansion and for contraction of the lenses, condensers, and the like each comprises a bow or like shaped spring portion having circumferential arms, extensions or wings, which are adapted to engage either directly or indirectly with the perimeter of the lens.

This invention is applicable to lenses, condensers, reflectors and other such glass or similar articles or bodies used in connection with or in relation to means of illumination.

In order that this invention may be clearly understood and more readily carried into practice, reference may be had to the appended explanatory three sheets of drawings, upon which:—

Figure 1:
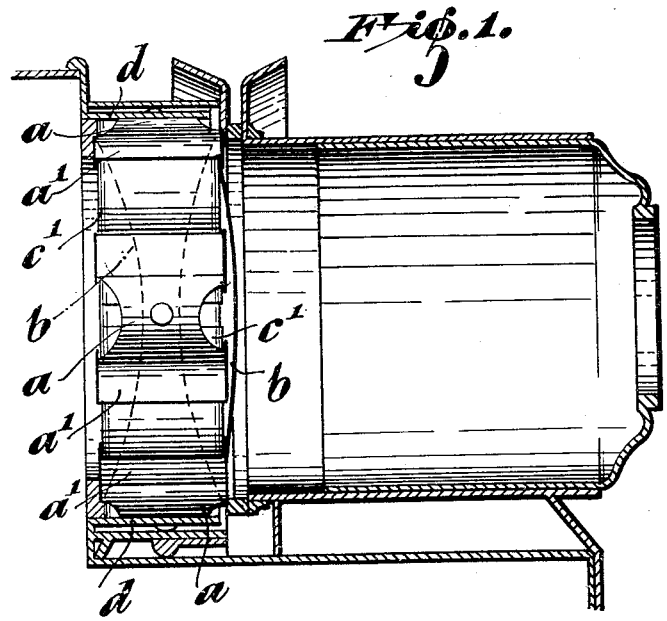
Figure 2:
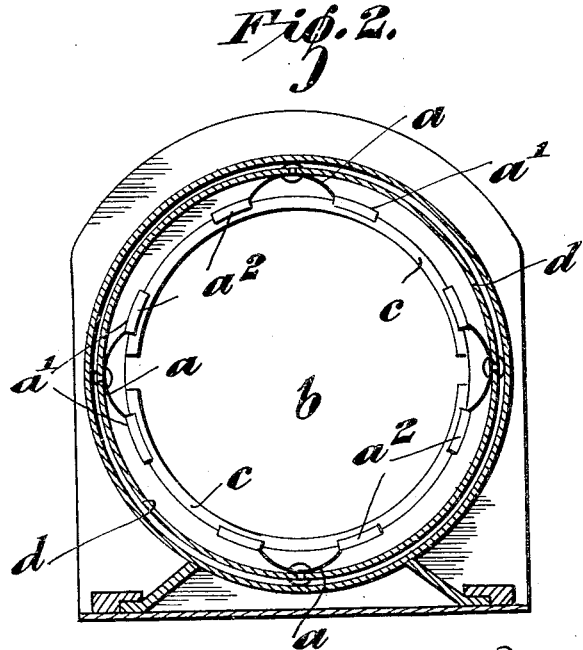

Figure 1 is a part-sectional side elevation of a kinematographic or like apparatus illustrating the present invention in conjunction therewith. Fig. 2 is a sectional front elevation of the arrangement shown in Fig. 1. Fig. 3 is a part-sectional side elevation illustrating the present invention as applied to a lamp. Fig. 4 illustrates on an enlarged scale a spring supporting member according to the present invention. Fig. 5 is a detail view in perspective illustrating a spring supporting member contained between flanges on the outer carrier member or casing. Fig. 6 is a plan view of a modified form of spring support according to this invention. Fig. 7 is a perspective view of the member shown in Fig. 6. Fig. 8 illustrates in elevation the modified form of supports assembled upon sectional elevation illustrating the lens with the modified form of spring supports mounted within an outer casing.

In a convenient embodiment of the present invention each spring supporting member is comprised of a member which is bow or arc-shaped or bulged at the center, the bow shaped part $a$ being provided at its extremities with arms or extensions $a^1$ which may be more or less straight or flat and which may advantageously occupy positions in planes disposed at an obtuse angle in relation to each other. The extended parts $a^1$ are advantageously each provided with flanges $a^2$ one on each side.

The mirror, reflector or other article $b$ to be supported is advantageously furnished around its circumference with a composite or other casing or ring $c$ advantageously in two or more sections permitting of the expansion of the reflector or the like $b$ with heat and after the sections $c$ have been assembled the spring members are placed in position outside of same with their flanges $a^2$ at the front of and to the rear of the mirror, while the bow-shaped part $a$ of the spring projects away from the periphery of the mirror $b$. When therefore the mirror with a suitable number of the spring members is assembled in a larger ring or casing $d$ the bow-shaped or bulging parts $a$ of the spring members engage with the interior of the larger ring $d$ thereby supporting the mirror $b$ while still allowing of its expansion as in the event of expansion one or other or both of the extensions or arms $a^1$ of each spring member slide in relation to the periphery of the mirror $b$ or the casing $c$ thereof avoiding any tendency to cramp the mirror from expansion. The bulging or bow shaped parts $a$ of the spring members may take a position between flanges $d^1$ in the outer or carrier ring $d$ to prevent the mirror $b$ from being displaced forwardly or rearwardly as illustrated in Fig. 5 or the bow-shaped parts $a$ might be riveted as illustrated in Figs. 1 and 2, or may otherwise suitably coöperate with the carrier ring $d$. Thus outward flanges may be provided one on each side of the bow-shaped part to centrally receive the outer or carrier ring. The outer or carrier a suitable carrier member. Fig. 9 is a front ring may be installed in any suitable manner in the lamp or apparatus, or it may itself form part of the lamp. The edges of the composite ring $c$ directly surrounding the mirror $b$ may if desired be flanged on both sides thereof. Where such a composite ring is adapted to support two lenses one on each side as illustrated in Fig. 1, grooves or channels $c^1$ may be provided around the interior of the composite ring $c$ one on each side to each support a lens so that the lenses cannot be displaced in relation to each other. A single ring $c$ may be used if it is split or otherwise incorporated in such a manner as to accommodate the expansion of the glass.

The spring member $a$ may be furnished with tongue pieces or extensions $a^3$ on the arms $a^1$ which tongue pieces are adapted to be slidably inserted within suitable sockets furnished on the casing or composite ring $c$. Each socket may advantageously be formed by making two parallel cuts transversely in the metal of the casing so as to leave a substantially narrow strip $c^1$ between said cuts, which strip $c^1$ is raised up somewhat from the plane of the casing $c$ so as to form a bridge piece beneath which the tongue piece $a^3$ may be slidably inserted. By this means, if the lenses or the like are rotated, the spring supporting members are carried with same thereby preventing the spring members from scratching or otherwise injuring the lens, reflector or the like during the rotating or turning movement.

In a modification of the present invention, as applied to kinematograph apparatus or the like, (as shown in Figs. 6 to 9 inclusive) each bow-shaped spring portion $a$ is furnished with circumferential extensions or arms $a^4$ in the form of plate or like portions extending out transversely in opposite directions in relation to the said bow portion, thereby forming a member, which is of substantially H formation. These supporting members are adapted to be assembled upon the inner faces of suitable semi-circular or arc-like carrier members $e$, which are in turn adapted to be assembled within an outer casing, annulus or the like $f$, or within a suitable annular portion of the apparatus, when the lenses are in position.

Suitable rectangular or like apertures $e^1$ are cut or otherwise provided in the carrier members $e$ and the spring supporting members are so assembled within the said carriers that the bow-shaped portions $a$ project outward through the apertures $e^1$ and bear either directly or through the medium of suitable lugs or projections $f^1$ mounted thereon against the inner face of the outer casing $f$.

Circumferential grooves or channels $e^2$ are formed along each side edge of the carriers $e$, and coresponding grooves or channels $a^5$ are also furnished along the outer extremities or edges of the transversely projecting arms or extensions $a^4$, the arrangement being such that when the spring supporting members are assembled in position within the carriers $e$ the grooved edges $a^5$ are disposed within the grooves $e^2$.

For preventing the accidental displacement of the spring supports from the carriers, flexible tongues $g$ may be furnished upon the bow-shaped spring portions $a$, which tongues may be inserted through slots $g^1$ in the carriers $e$, and bent over to the rear thereof. In this way the spring supports are loosely fixed and prevented from falling away from the carriers, while at the same time the efficiency of the said spring supports is in no wise diminished.

Advantageously two of the part circular carriers $e$ are employed each having incorporated therewith two spring supports $a$, and the lenses $b$ are adapted to be assembled between the two carriers, the peripheries of same being accommodated by the circumferential grooves $e^2$ and $a^5$ and the parts thus assembled are then inserted within the outer annulus or like part $f$.

Bayonet grooves $f^2$ may if desired be formed in the annular casing $f$ so as to accommodate lugs or projections $f^1$ upon the spring supports $a$ and facilitate the insertion and removal of the lenses and carriers.

What I claim as my invention and desire to secure by Letters Patent is:—

1. In a device for retaining circular reflectors and the like in position within a lamp or other illuminating device, an annular split ring disposed on the periphery of said circular reflector, a series of bow shaped members disposed around the periphery of said annular split ring and fixed in position with respect to said lamp, each of said bow shaped members comprising a resilient portion, and extended parts integral with said resilient portion and having flanges adapted to engage said annular split ring, substantially as described.

2. In a device for retaining annular reflectors and the like in position within a lamp or other illuminating device, an annular split ring disposed on the periphery of said circular reflector, channels provided on said annular split ring, a series of bow shaped members disposed around the periphery of said annular split ring and fixed in position with respect to said lamp, each of said bow shaped members comprising a resilient portion and extended parts integral with said resilient portion and adapted to engage said split ring and the channels thereon substantially as described.

3. In a device for retaining circular reflectors and the like in position within a lamp or other illuminating device, a series of bow shaped members disposed around the peripheries of said circular reflectors and secured to the said lamp or other illuminating device, each of said bow shaped members comprising a resilient portion, an extended part integral with said resilient portion, grooved flanges on said extended part adapted to engage said circular reflector and retain the same in place, substantially as described.

In witness whereof I have hereunto set my hand in the presence of two witnesses.

ROBERT ALEXANDER OLDFIELD.

Witnesses:
ARTHUR H. BROWN,
I. AUGUSTUS DADY.

Copies of this patent may be obtained for five cents each, by addressing the "Commissioner of Patents, Washington, D. C."